United States Patent
Bantz et al.

(10) Patent No.: US 6,925,488 B2
(45) Date of Patent: Aug. 2, 2005

(54) DISTRIBUTED INTELLIGENT INFORMATION TECHNOLOGY OPERATIONS AUTOMATION

(75) Inventors: David Frederick Bantz, Chappaqua, NY (US); Steven James Mastrianni, Unionville, CT (US); Sunil K. Sreenivasan, Mt. Kisco, NY (US)

(73) Assignee: International Business Machines Corporation, Armonk, NY (US)

(*) Notice: Subject to any disclaimer, the term of this patent is extended or adjusted under 35 U.S.C. 154(b) by 778 days.

(21) Appl. No.: 09/795,791

(22) Filed: Feb. 28, 2001

(65) Prior Publication Data

US 2002/0120694 A1 Aug. 29, 2002

(51) Int. Cl.[7] ............................................. G06F 15/16
(52) U.S. Cl. ........................ 709/206; 709/217; 709/218; 709/219; 709/223; 709/224; 709/225; 709/238; 707/2; 707/5
(58) Field of Search .................................. 709/206, 217, 709/218, 219, 223, 224, 225, 238; 707/2, 5

(56) References Cited

U.S. PATENT DOCUMENTS

| | | | |
|---|---|---|---|
| 4,701,845 A | 10/1987 | Andreasen et al. | |
| 5,796,942 A | 8/1998 | Esbensen | |
| 5,944,839 A | 8/1999 | Isenberg | |
| 6,021,262 A | 2/2000 | Cote et al. | |
| 6,073,172 A | * 6/2000 | Frailong et al. | 709/222 |
| 6,148,402 A | 11/2000 | Campbell | |
| 6,663,912 B2 | * 12/2003 | Gandhi et al. | 709/224 |
| 6,691,067 B1 | * 2/2004 | Ding et al. | 702/186 |

\* cited by examiner

*Primary Examiner*—Ario Etienne
*Assistant Examiner*—Yves Dalencourt
(74) *Attorney, Agent, or Firm*—Foster, Swift, Collins & Smith, PC; Allan O. Maki; Thu A. Dang

(57) ABSTRACT

Methods and systems for efficient and effective distribution of system management messages between customer and service provider sites are provided. Customer sites each recognize characteristics of the content of messages distributed by the system and receive only messages relevant to the customer site. System dynamic changes are adapted to such as inter-site communication link interruption or congestion and providing seamless automated information technologies operations during these system dynamic changes. Automated management services are only postponed until such communication link can be restored. Two illustrative embodiments are provided. In one embodiment, system management resides at the service provider site with local system management backup at the customer site. In a second embodiment, system management resides at both the service provider site and customer site.

22 Claims, 3 Drawing Sheets

DISTRIBUTED INTELLIGENT INFORMATION TECHNOLOGY OPERATIONS AUTOMATION

BACKGROUND OF THE INVENTION

1. Field of the Invention

The present invention relates generally to information technology (IT), and specifically to IT services provided by a service provider. The methods and systems of the present invention allow a service provider to manage a customer computer system under a variety of system conditions using a collection of cooperating processes or services, each with a domain of expertise and distributed between local and remote locations.

2. Discussion of the Prior Art

In many computer system configurations, including computer network systems, a customer has a network of on-site client and server computers. These computers run software for various customer specific processes. A service provider for the customer also has a network of client and server computers at its site to run software that provides various remote system management services to the customer through an inter-site communication link. Such remote management can include anti-virus scanning, system monitoring (e.g., disk capacity, memory capacity and CPU processing), disk defragmentation, software upgrade, and recovery from hardware and software failures.

Systems permitting this type of remote system management typically install agent software from the service provider on computers at the customer site. These agents receive and execute commands, expressed as messages, from the computers at the service provider site. These agents monitor the customer computer functions, both hardware and software, and originate events as messages. The agent system sends these messages to the system management software on computers at the service provider site.

Although efficient, this remote method of managing customer computers is vulnerable to dynamic changes within the network system. Such dynamic changes can include adverse system conditions such as inter-site communication link problems. Inter-site communication links (i.e., linking customer and service provider computers) can be interrupted for many reasons or slowed by congestion caused by other information passing along the same inter-site connection. These interruptions can cause a lack of timely interaction between customer and service provider systems. Further, congestion in the communication network can delay both command and event messages, preventing a timely resolution of problems and an accurate representation of the customer's computer's operating status. Further, some hardware and software problems at the customer site may also affect the inter-site communication link.

Methods and systems to address the inter-site communication link problem in system management are needed. Rather than a single off-site service responsible for all managed customer situations, this new system should act as a collection of cooperating processes or services, each with a domain of expertise and distributed between local and remote locations.

Surveillance systems that apportion system management between the customer site and service provider site are known in the prior art. Esbensen et al., U.S. Pat. No. 5,796,942 describes a method and apparatus for ensuring secure network communications by conducting surveillance and checking data transmitted on a network for noteworthy or suspicious activity in real time. Detection of such activity generates a command and appropriate intervention actions are taken. In one embodiment of this invention, surveillance agents capture events and transfer them to a server for reconstruction and analysis at a remote site.

Unfortunately, Esbensen et al., does not address the need for system management software having a collection of cooperating processes or services, each with a domain of expertise and distributed between local and remote locations.

SUMMARY OF THE INVENTION

Accordingly, the present invention provides methods and systems for efficient and effective distribution of management messages between customer and service provider sites. The invention ensures inter-site messages are appropriately routed according to information within the message in a flexible manner based on system conditions and configuration.

The invention also adapts to system dynamic changes such as inter-site communication link interruption or congestion and provides seamless automated information technologies operations during these system dynamic changes. Automated management services are only postponed until such communication link can be restored.

Two embodiments are provided to illustrate the invention. In one embodiment, system management resides at both the service provider site and customer site. In a second embodiment, system management resides at the service provider site with local system management backup at the customer site. The invention will be better understood with reference to the following figures and detailed description.

BRIEF DESCRIPTION OF THE FIGURES

The foregoing advantages and features, as well as other advantages, will become apparent with reference to the description and figures below, in which like numerals represent like elements and in which.

DETAILED DESCRIPTION

Figure 1:
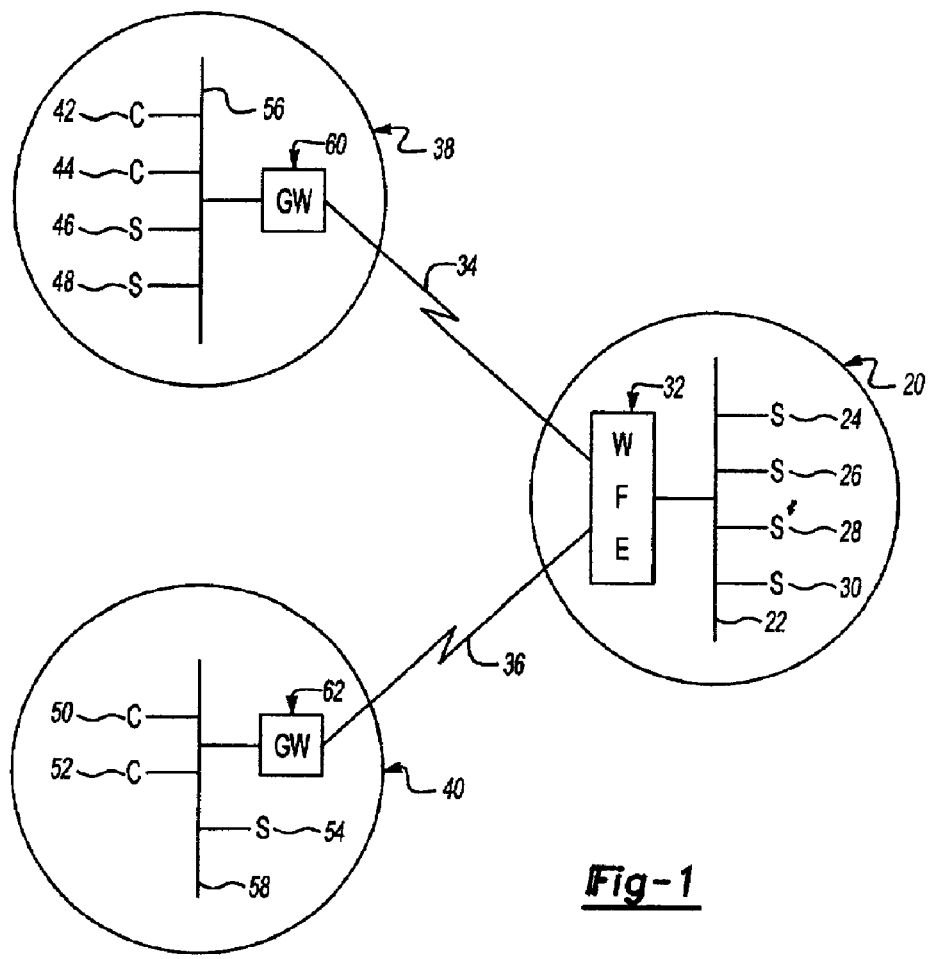
FIG. 1 is a block diagram of a computer system having a service provider and two customers, and shows the relationship of clients, servers, gateways and other components to the intra-site and inter-site communication links.

In general, the present invention can be realized as methods or systems or in hardware, software, or a combination of hardware and software of a computer system including a computer network system. A visualization tool according to the present invention can be realized in a centralized fashion in one computer system, or in a distributed fashion where different elements are spread across several computer systems. Any kind of computer system— or other apparatus adapted for carrying out the methods described herein—is suited. A typical combination of hardware and software could be a general purpose computer system with a computer program that, when being loaded and executed, controls the computer system such that it carries out the systems and methods described herein. The present invention can also be embedded in a computer program product (or any computer useable medium having computer readable program code embodied therein), which comprises all the features enabling the implementation of the methods and systems described herein and which when loaded in a computer system is able to carry out these systems and methods.

Computer program means or computer program product in the present context means any expression, in any language, code or notation, of a set of instructions intended to cause a system having an information processing capability to perform a particular function either directly or after either or both of the following: (a) conversion to another language, code or notation and (b) reproduction in a different material form.

The present invention specifically relates to information technologies and, more particularly, to methods and systems, including computer programming means, for a service provider to effectively and efficiently manage a customer computer network using a computer network system such as a wide area network (WAN). It is understood that the term service provider for the present invention refers to either a commercial service provider or a service provider internal to an enterprise. An enterprise is well known in the prior art. Further, the computer programming means can include a computer program product including a computer usable medium having computer readable program code.

For example, the function of monitoring virus infection in a customer's computer can be managed by services specialized for that function and located at a specified site. Specific virus event messages must be delivered only to the specified site responsible for that specific event type. Command messages must similarly be delivered to only sites, agents, or services where a command is relevant.

The present invention provides on-site management of some customer services. The service provider can install a server computer at a customer site containing copies of some or all of a system management software. Thus, if an inter-site communication link is interrupted or congested, a service provider's server at the customer site can locally perform the same functions.

Customer-site based management services in the present invention apply to services that operate unattended and do not extend to personnel at a service provider site. Some attended management services can also be provided at the customer site if used in conjunction with remote management services when the inter-site communication link is functional. Thus, some local management situations can be automatically resolved by local management services. Situations that require attended remote services are resolved using those personnel and remote system management software. And, situations involving partial local resolution and partial remote resolution are possible.

Two embodiments of the present invention are presented herein for illustrative purposes, though others would be obvious to one skilled in the art. In the first embodiment, system management components reside on both the service provider site and the customer site with management control, but originate only from the service provider site. In a second embodiment, system management components reside on the service provider site with back-up components residing on the customer site, capable of exercising management control during inter-site communication link problems. Both embodiments allow seamless and adapting system management operations even during system dynamic changes as discussed above.

A possible overall configuration of the first embodiment of the present invention is illustrated using a computer network system shown in FIG. 1. Here, a service provider site 20 has an intra-site communication network 22 and servers 24, 26, 28, 30, and 32. Server 32 acts as a web front end (WFE) well known in the prior art utilizing, for example, International Business Machine's (IBM's) WebSphere suite of web-serving software. Server 32 processes inter-site communication links 34 and 36 and relays messages between them and the intra-site communication network 22. Server 32 also converts inter-site protocols (e.g., the hypertext transfer protocol (http)) to intra-site protocols.

The present invention requires at least one customer site, but other customer sites may optionally be included. FIG. 1, for illustration purposes, has two customer sites. A first customer site 38 includes first customer client computers 42 and 44 and first customer server computers 46 and 48. First customer site 38 also has an intra-site communication network 56 and a first customer gateway computer 60. An example of a gateway computer can be the Interjet II from Whistle Communications Corp. of 110 Marsh Drive, Foster City, Calif. An optional second customer site 40 includes second customer computers 50 and 52 and a second customer server computer 54. Second customer site 40 also has an intra-site communication network 58 and a second customer gateway computer 62. The gateway computers 60 and 62 handle the inter-site communication links 34 and 36 and relay messages between them and the intra-site communication networks.

Remote management services, such as the IT Director provided by Tivoli Systems Inc. of 9442 Capitol of Texas Highway North, One Arboretum Plaza, Austin, Tex., can typically be installed on servers in the service provider site 20. IT Director agent software is installed on managed computers at the customer site (such as first customer client computers 42 and 44, first customer server computers 46 and 48, second customer computers 50 and 52, and second customer server computer 54) and configured to monitor the operation of those computers and accept commands to modify or correct their operation. IT Director also has server software, typically installed on service provider computers such as servers 24, 26, 28 or 30, and is capable of receiving events from agents and originating commands to them. Note that the inter-site communication links 34 and 36 could be provided as a shared service of a data communications network such as the Internet.

The present invention provides an efficient and effective distribution of the management messages. The system management components with these cooperating services, each with their own domain of expertise and distributed between the customer site and the service provider site, minimize problems associated with system dynamic changes such as the inter-site communication link problems discussed above.

During inter-site communication link problems, the system can adapt to continue to provide system management services by postponing attended services until the communication link is restored. The system management operations can also ensure inter-site messages are appropriately routed, according to information within the message, in a flexible manner based on system conditions and configuration. Flexibility of the system management operations can include the ability to configure the distribution of system management components between the service provider site and the customer site. System management components can also reconfigure a server from a different location without any change to the components that generate events.

System management operations can also route various predetermined messages that represent events and commands in the computer network system, so that a computer belonging to one site interacts with at least one computer from the other site by exchanging messages. Therefore, the exchanged messages are events occurring not only in both the service provider site and the customer site, but also system management components by services distributed in either site.

Other design features of the present invention's system management components can optionally include the ability to configure the system if desired to restrict the relaying of inter-site messages to "only when necessary." For example, it is necessary to relay messages inter-site if a management component at the other site requires those messages. Messages of an informatory nature may be relayed at a time when adequate inter-site communication link bandwidth is available. Further, as discussed above, inter-site and intra-site messages can be routed according to characteristics of their contents in a flexible manner based on the system conditions and configuration. Therefore, multiple recipients of messages can be accommodated without burdening a message sender with the identification of all of the recipients. And finally, the system management components economize the use of the computer network system by sending all messages only once, regardless of the number of recipients.

Figure 2:
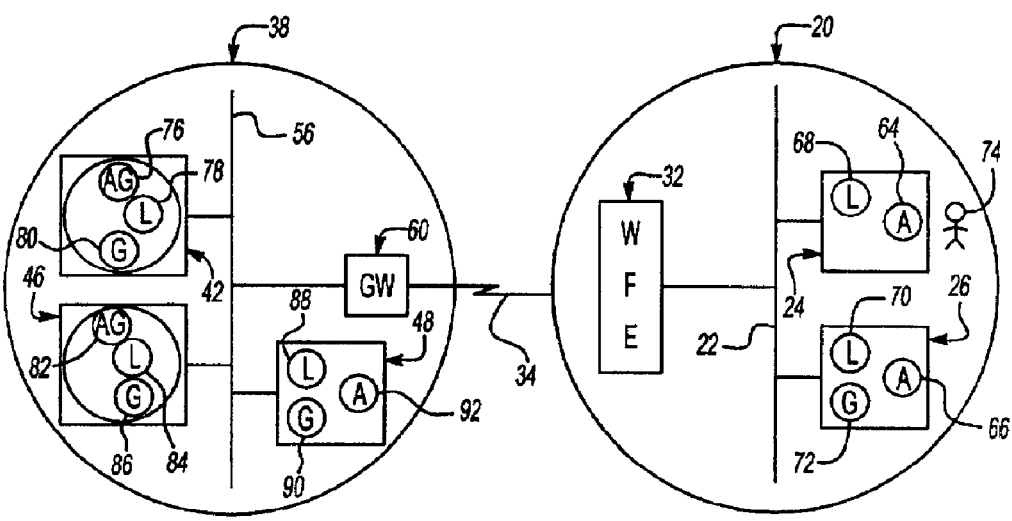
FIG. 2 is a block diagram of a service provider and one customer, in which can be shown both hardware and software relevant to the support of remote management function.

FIG. 2 depicts certain illustrative hardware and software components which can be employed to permit service provider site 20 to remotely manage first customer site 38. For the purposes of this illustration, two system management components are added: a listener and a generator. The listener and generator are analogous to the elements of a receiver and transmitter in a radio communication system. The listener receives management messages (messages) and adapts them to the needs of other software, typically by converting their representation from an encoded form suitable for communication to an object-oriented form suitable for subsequent processing. The generator performs the inverse function, by receiving object method calls and converting them to a representation suitable for communication.

Within the service provider site 20 are servers 24 and 26 with management applications 64 and 66 and listeners 68 and 70 respectively. Server 26 also adds a generator 72. Together, the management application, listener and generator form a remote management service.

For illustrative purposes only, two system management component services are shown in FIG. 2 representing server 24 and server 26. A human operator 74 attends server 24, while server 26 can be unattended. Many other possible configurations are possible.

First customer client computer 42, in FIG. 2, also illustrates three system management components: an agent 76, a listener 78 and a generator 80. This combination of the agent, listener and generator forms a remote management client to the service provider. First customer server computer 46 also has the three system management components: an agent 82, a listener 84 and a generator 86. Again, the combination of the agent, listener and generator form the remote management client. Also shown within first customer site 38 can be the first customer server computer 48 containing a listener 88, a generator 90 and a management application 92. This first client server can be unattended.

Listeners 68, 70, 78, 84 and 88 receive various management messages. These messages are often in the form of commands but may be informatory in nature. Generators 72, 80, 86 and 90 generate management messages. The function of agents 76 and 82 can be to monitor either the first customer client computer 42 or the first customer server computer 48 and to cause generators 80 and 86 to emit events when monitoring thresholds are exceeded. Similarly, agents 76 and 82 receive commands from listeners 78 and 84 and take action on first customer client computer 42 or first customer server computer 48 hardware or software.

Remote management services such as those having listeners 68 and 70, generator 72, and management applications 64 and 66 react to events received by their listeners 68 and 70. This reaction can take the form of conveying information to a human operator 74, as in the case of server 24, or it can be of the form of creating commands and sending them via generator 72. In the latter case, the management service can be considered to be unattended or automated. Local management services such as those having a listener 88, generator 90 and management application 92 react to events received by their listener 88. This reaction can be of the form of conveying information to a local human operator, not shown, or as in the case of first customer server computer 48, it can be of the form of creating commands and sending them via generator 90.

The system in FIG. 2 illustrates how management messages within first customer site 38 that originate from first customer client computer 42 and first customer server computer 46 are sent to first customer server computer 48 and can also be sent via first customer gateway computer 60 and server 32 to servers 24 and 26. Similarly, management messages originating at servers 24 and 26 can be sent to first customer client computer 42 or first customer server computer 46 via first customer gateway computer 60 and server 32. Management messages originating at first customer server computer 48 can be sent directly to first customer client computer 42 or first customer server computer 46. To assure proper routing and delivery of these messages, they must contain an address of their destination, and the sender of these messages must know that address. Although networking hardware and software well known in the prior art permit such messages to contain the name of their destination rather than the address of the destination, there can still be a requirement that the sender of these messages know a unique identifier of their destination. This requirement is not in accord with an important operational characteristic of management systems: that these systems be capable of adapting themselves to dynamic changes in the system configuration, including but not limited to, the addition or deletion of client or server computers.

The present invention removes this requirement by routing and delivering certain management messages to their destinations without requiring senders to maintain knowledge of the unique identifier of the destination. It is a known characteristic, for example, that certain management messages contain event notifications and these events fall into certain categories. Responsibility for acting on event notifications can be partitioned among multiple management servers so that one server may only be concerned with events of a certain category while another may be concerned with all events. In a logical sense, event messages are routed to their destination without the sender's knowledge of the name or other unique identifier of their destination. The message routing depends on an expression by the destination of what categories of messages that destination can be desirous of receiving. For the present invention, a message router and a proxy may be needed. A message router redirects messages to a given destination, based on their categories. A proxy relays messages from site to site based on their categories.

Figure 3:
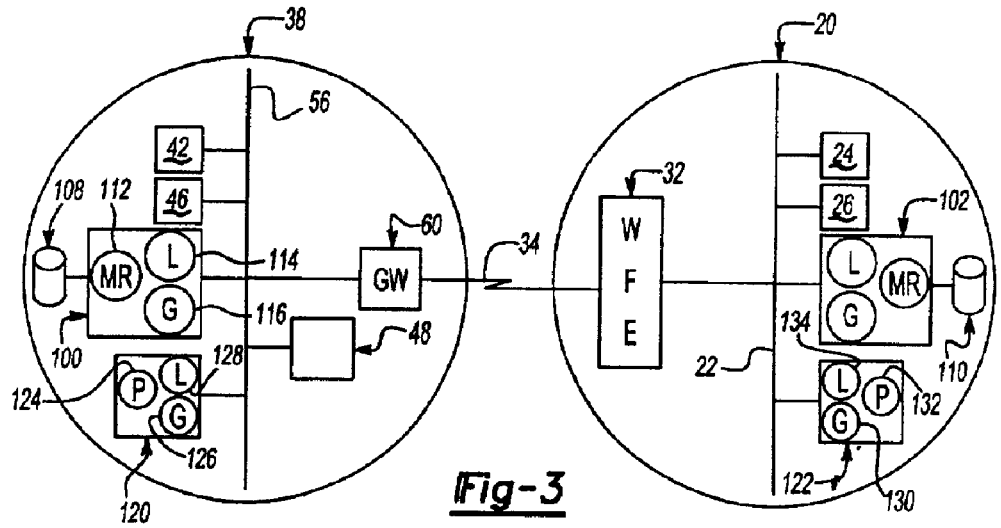
FIG. 3 is a block diagram of a customer site 2 and service provider site 1 augmented by the addition of message router servers and proxy servers.

FIG. 3 illustrates a schematic view of the first customer site 38 and service provider site 20 augmented by the addition of message router servers 100 and 102 and proxy servers 120 and 122. The function of message router servers 100 and 102 are described presently, and the function of the proxy servers deferred. The message router servers 100 and 102 maintain databases 108 and 110 respectively, relaying message categories to message destinations. Both message routers receive all messages not sent by them. They capture each message, consult their respective databases to determine which, if any, destinations have expressed a desire to receive messages of that category, access their databases to obtain a network address of each destination and re-send the message to a specific destination designated by its network address. Thus, message originators do not need to know the network address of the destinations of their event messages.

Figure 4:
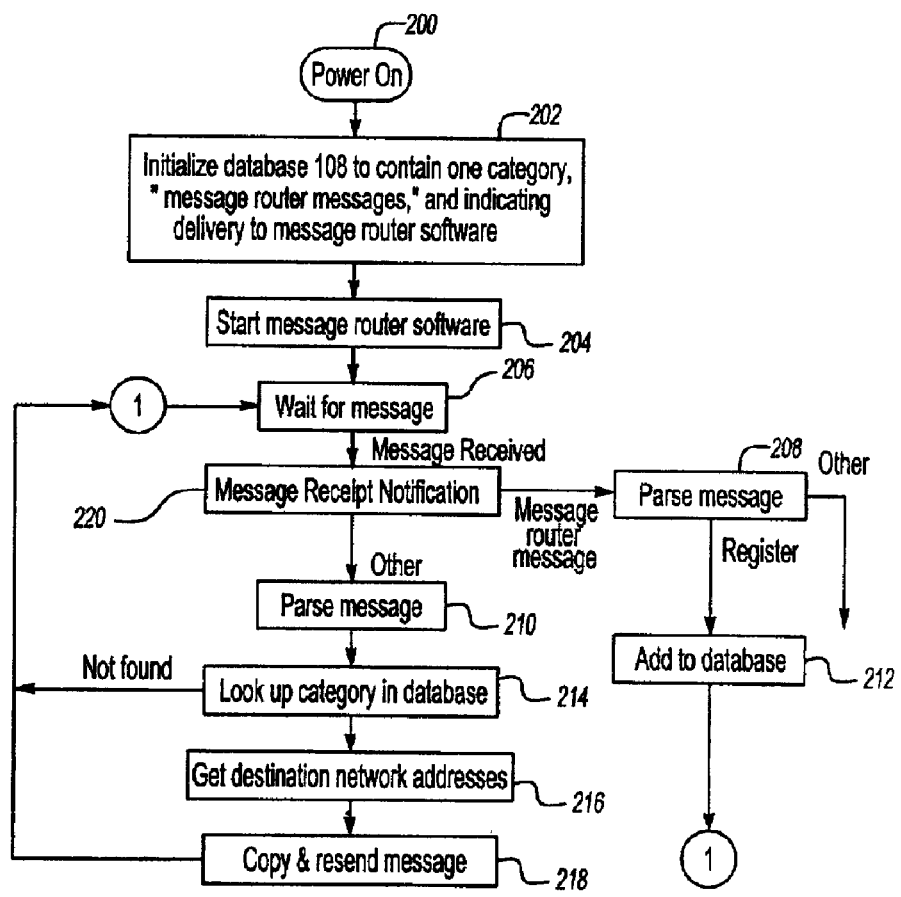
FIG. 4 is a processing flowchart of the message router server.
Figure 5:
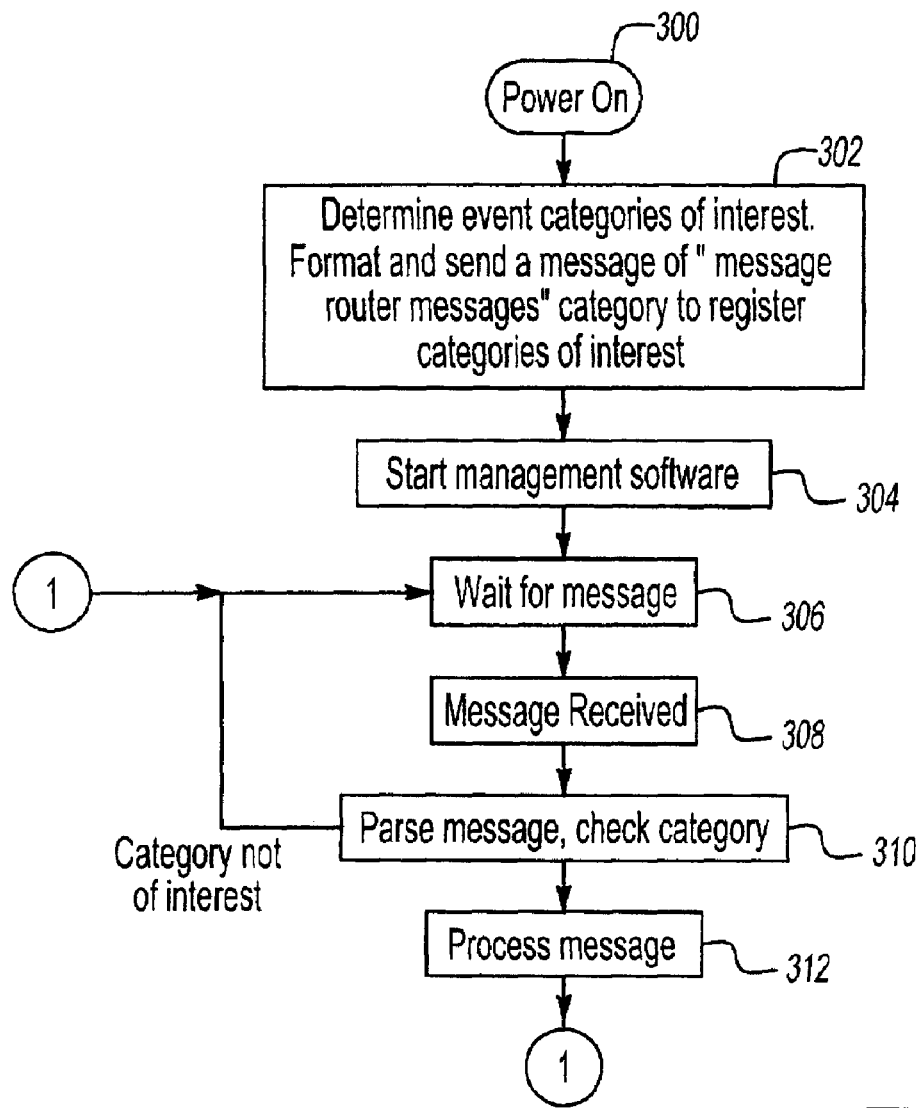
FIG. 5 is a processing flowchart of the management server.

A possible flow of processing of the message router server 100 can be shown in FIG. 4; that of the first customer server computer 48 can be shown in FIG. 5.

The flow of processing in FIG. 4 begins with message router server 100 being powered on and initializing at Step 200. It sets itself to pass messages of a distinguished category, called "message router messages," to its own message routing software 112. When first customer server computer 48 is powered on and initializes, it determines that its software can be designed to be responsive to a certain category of management events, for example, "disk failure" events. First customer server computer 48 then sends a message of the "message router message" category, indicating that it can be desirous of receiving events of the "disk failure" category, and including its network address, for example, 999. Message router server 100 can receive this message and subject results in an entry in database 108.

Assume next that first customer client computer 42 experiences an internal condition requiring an external notification in the form of an event. Using its message generator shown in FIG. 2, first customer client computer 42 formats and sends an event message of the appropriate category, for example, "disk failure." Since message router server 100 can be enabled to receive all messages, its listener 114 captures the event message and passes the event message on to message router software 112. Message router software 112 accesses database 108 using the event category as a key. It finds an entry with network address 999, copies the original message but this time with the specific network address 999 and sends it. First customer server computer 48 then receives the message and acts on it.

FIG. 4 illustrates the processing steps in the message router servers 100 and 102. At step 200, the message router powers on and performs otherwise necessary initialization steps discussed above. In step 202, the router makes an entry in database 108 to reflect the fact it can be desirous of receiving a certain category of messages, that category being "message router messages." This eliminates the need for any other client computer or server to have to know the network address of the message router itself. In step 204, the message router starts the main loop of its software, represented in FIG. 4 by steps 206, 208, 210, 212, 214, 216, 218 and 220.

In step 206, the message router waits for an incoming message. When the message arrives in step 220, it first determines if it can be of the "message router messages" category and, if so, parses the message in step 208. This step can be hard-coded or can be partially accomplished through database access. The message will contain an indication that it can be a registration message and will contain both a category of interest and a network address. These values are entered into the database 108 in step 212. If the category of the message received in step 220 can not be of the "message router message," then the message can be parsed in step 210 and the category retrieved. In step 214, the category can be used as a key to access database 108. The database record returned will contain a network address. Next, in step 216, that address can be retrieved from the database record and passed to step 218. In step 218, a copy of the message received in step 220 can be created, this time with a network address, and the message can be sent. Networking hardware and software (not shown but known in the prior art) then accomplish the delivery of the message to its destination.

Note that in step 214 the message category may not correspond to any record in the database. Preferably, the database can be initialized so that all categories for which no other computer has registered have database records with a network address of a special server, whose responsibility can be to log messages and perhaps to generate a new event whose category can be an "orphan event." Such an event may be meaningful, but not to a currently active server. Alternatively, this server can be configured to register with the message router using a special type of message router message, establishing itself as a default destination for all otherwise undeliverable messages.

FIG. 5 illustrates a process flow for a system management server on the first customer server computer 48. In step 300, the system management server can be powered on and performs necessary initialization. In step 302, initialization software creates a message whose category can be "message router messages" and uses the message to register the event categories of interest with the message router. In step 304, the main loop of the system management software can be started. In step 306, the system management software waits for a message. When a message can be received in step 308, the system management software parses the message in step 310, obtaining its category. Although the management server should only receive messages of interest, in step 310 the message category can be verified and in step 312 the message can be processed according to the procedures established for the handling of events of this category. Step 306 can be then entered to wait for the next message.

Referring back to FIG. 3, first customer site 38 also has proxy server 120 and service provider site 20 has proxy server 122. Proxy server 120 has a proxy 124, listener 128 and generator 126. Proxy server 122 has a proxy 132, listener 134 and generator 130. Server 24 may be a management server responsible for handling events of a certain category not otherwise handled within the first customer site 38. In that case, the proxy servers 120 and 122 pass messages between the first customer site 38 and the service provider site 20. Since bandwidth may be limited on a wide-area-network (inter-site communication link 34) or there may be a per-packet charge for messages carried, it can be desirable to limit the use of the wide-area-network to an absolute minimum.

To further illustrate how to extend the messaging architecture previously described, assume the server 24 is a management server responsible for handling messages of a certain category and first customer client computer 42 occasionally generates messages of this category. The server 24 could register with its local message router server 102 precisely as if the event messages it can be interested in were generated internally to the first service provider site 20.

This flow can be as shown in FIG. 5. Nevertheless, the function of the message router can be enhanced. In step 212 of FIG. 4 or immediately subsequent, a representation of an union of all desired categories can be updated. That is, this representation can be initially empty before any management server has registered; as registrations are received, the representation can be updated to reflect the a new registration. At each moment in time, this representation matches exactly the set of active categories registered. For example, if server 24 has registered for categories A and B and server 26 has registered for categories B and C, the union representation will match categories A, B and C (the currently active categories) in incoming messages.

Many forms are possible for this representation. One especially simple form can be possible if each category can be represented by an encoding in which a unique bit position can be allocated to each category. For example, if a message can be of category A, then bit 6 in a certain message field can be set; if of category B, then bit 7 can be set. This encoding, referred to in the art as a "one-hot" encoding, permits messages to be of multiple categories. With this form of category encoding, the union representation has a bit set for each active category and can be formed as the logical or of the representations of all of the active categories.

The union representation can be then forwarded to the proxy server at the other site. For example, the union representation created by this enhanced message routing software 112 of message routing server 100 can be forwarded to the proxy server 122 on the service provider site 20 via the intra-site communication network 56, first customer gateway computer 60, inter-site communication link 34, server (WFE) 32, and service provider intra-site communication network 22. The proxy server 122 uses the union representation to register with message routing server 102. That is, the proxy server 122 indicates to message routing server 102 its interest in receiving all messages whose categories are represented in the union representation just received. This registration can be identical in manner to the registration by management servers, shown in step 302 of FIG. 5. Proxy server 122 next forwards all messages received to proxy server 120 via intra-site communication network 22, server (WFE) 32, inter-site communication link 34, first customer gateway computer 60, and intra-site communication network 56. Proxy server 120 then resends all messages to the message router 100.

The aforementioned example accomplishes the desired goal of inter-site event forwarding. Events generated on the service provider site 20 are forwarded to the first customer site 38 only if their categories match categories registered with message router server 100. These are only specific events that first customer server computer 48 and others on the customer site have declared their interest in.

One skilled in the art can readily use this embodiment to extend this implementation to multiple service provider sites and multiple customer sites. Messages other than event messages can be forwarded. Preferably, proxy servers use messaging/queuing techniques (as found in IBM MQSeries software products) to ensure reliable delivery of inter-site messages, even if there are temporary outages in the inter-site communications network.

Note that because messages are sent between sites in a form in which destination addresses are not contained in the messages, but rather the messages contain message category information, each message need be sent only once regardless of the number of eventual recipients. This is because the immediate destination of messages sent inter-site can be first the proxy server and then the message router. It is the responsibility of the local message router to duplicate and re-send messages to each of their eventual destinations based on registration information contained in the message router server database.

In a second embodiment of the invention, which can also be described using the system described in FIGS. 2 and 3, first customer server computer's 48 listener 88 and generator 90 communicate to and from first customer computers 42 and 46 and servers 24 and 26. First customer server computer 48 also contains management application 92 whose purpose is to exercise management control over first customer client computers 42 and 46 under the condition that intra-site communication link 34 is unavailable or highly congested. FIG. 3 illustrates the presence of message routing software 112 in this system.

In this second embodiment, where first customer server computer 48 exercises local management control, both the proxy 124 and the message routing software 112 illustrated in FIG. 3 function to route messages among the various computers as in the first embodiment. This facilitates the exercise of local management control, especially since the content-driven routing of messages eliminates the need for managed systems to be aware of what system element is managing them.

The above-described embodiments of the invention are provided purely for purposes of example. Many other variations, modifications, and applications of the invention may be made.

We claim:

1. A computer system at a service provider site configured to interact with at least one customer site over a computer network system for efficient and effective distribution of inter-site and intra-site computer system management messages, comprising:

system management components providing distributed attended and unattended cooperating services, each with a domain of expertise, and having recognizable characteristics, said system management components not requiring inclusion of customer identification or registration information;

the system management components further including services to automatically efficiently and effectively forward inter-site computer system management messages; and said customer site having means to recognize characteristics of the content of messages distributed by said system management components and to receive only messages relevant to the customer site.

2. The system of claim 1 wherein the system management components and said customer site means comprise agents, listeners, and generators.

3. The system of claim 1 wherein the system management components reside on the service provider site and back-up system management components reside on the customer site.

4. The system of claim 1 wherein the system management components reside on the service provider site and reside on the customer site, wherein distribution of computer system management messages is seamless even during inter-site communication link problems.

5. The system of claim 1 wherein the computer network system further comprises a component to postpone inter-site attended services during inter-site communication link problems until the inter-site communication link is restored.

6. The system of claim 1 wherein the system management components ensure inter-site system management messages are appropriately routed according to information within the message in a manner permitting flexible system reconfiguration.

7. The system of claim 6 wherein system management components comprise the ability to reconfigure a server from a different location without any change to the components that generate events.

8. The system of claim 1 wherein the system management components exchange inter-site system management messages that represent events occurring in the service provider site, the customer site, and actions by system management components distributed in the service provider site and customer site.

9. The system of claim 1 wherein the system management components send inter-site system management messages only when necessary.

10. The system of claim 1 wherein system management components economize use of the computer network system by sending all inter-site system management messages only once, regardless of the number of recipients.

11. The system of claim 1 wherein inter-site and intra-site computer system management messages are routed according to characteristics of their content in a flexible manner based on system conditions and configuration, whereby multiple recipients of messages are accommodated without burdening a message sender with the identification of all of the recipients.

12. A method for efficient and effective distribution of inter-site and intra-site computer system management messages by a computer system at a service provider site configured to interact with at least one customer site over a computer network system, the method comprising the steps of:

providing system management components, said system management components not requiring inclusion of customer identification or registration information;

using said components for distributing to a plurality of customer sites messages relating to attended and unattended cooperating services, each with a domain of expertise and having recognizable characteristics, said customer sites each having means to recognize characteristics of the content of messages distributed by said system management components and to receive only messages relevant to its customer site.

13. The method of claim 12 wherein the system management components comprise agents, listeners, and generators.

14. The method of claim 12 wherein the system management components reside on the service provider site and back-up system management components reside on the customer site.

15. The method of claim 12 wherein the system management components reside on the service provider site and reside on the customer site, wherein distribution of computer system management messages is seamless even during inter-site communication link problems.

16. The method of claim 12 wherein managing system components comprises the step of postponing inter-site attended services during inter-site communication link problems until the inter-site communication link is restored.

17. The method of claim 12 wherein managing system management components comprises the step of ensuring inter-site system management messages are appropriately routed according to information within the message in a flexible manner based on system conditions and configuration.

18. The method of claim 17 wherein the flexible manner comprises the step of configuring the distribution of system management components between the service provider site and the customer site.

19. The method of claim 12 wherein managing the system management components comprises the step of exchanging inter-site system management messages that represent events occurring in the service provider site, the customer site, and actions by system management components distributed in the service provider site and customer site.

20. The method of claim 12 wherein the managing the system management components comprises the step of sending inter-site system management messages only when necessary.

21. The method of claim 12 wherein managing system management components comprises the step of economizing use of the computer network system by sending all system management messages only once, regardless of the number of recipients.

22. The method of claim 12 wherein distributing attended and unattended cooperating services between the customer site and the service provider site comprises the step of routing messages according to characteristics of their content in a flexible manner based on system conditions and configuration, whereby multiple recipients of messages are accommodated without burdening a message sender with the identification of all of the recipients.

* * * * *